United States Patent [19]

Fan et al.

[11] 4,070,679

[45] Jan. 24, 1978

[54] METHOD AND APPARATUS FOR RECORDING INFORMATION ON A RECORDING SURFACE BY THE USE OF MAGNETIC INK

[75] Inventors: George J. Fan, Ossining; John C. Slonczewski, Katonah, both of N.Y.

[73] Assignee: International Business Machines Corporation, Armonk, N.Y.

[21] Appl. No.: 591,982

[22] Filed: June 30, 1975

[51] Int. Cl.$^2$ .................... G01D 15/18

[52] U.S. Cl. .................... 346/75

[58] Field of Search .................... 346/75

[56] References Cited

U.S. PATENT DOCUMENTS

| | | | |
|---|---|---|---|
| 1,198,270 | 9/1916 | Poulsen | 346/75 X |
| 1,882,043 | 10/1932 | Schroter | 346/75 X |
| 3,287,734 | 11/1966 | Kazan | 346/75 X |
| 3,484,793 | 12/1969 | Weigl | 346/75 |
| 3,709,432 | 1/1973 | Robertson | 346/75 X |
| 3,805,272 | 4/1974 | Fan et al. | 346/75 |
| 3,864,692 | 2/1975 | McDonnell et al. | 346/75 |
| 3,878,518 | 4/1975 | Garwin | 346/75 X |
| 3,893,623 | 7/1975 | Toupin | 346/75 X |

*Primary Examiner*—Joseph W. Hartary
*Attorney, Agent, or Firm*—Frank C. Leach, Jr.

[57] ABSTRACT

A silicon body has an array of nozzles therein and a separate magnet for each nozzle integral with the body. The magnet is disposed adjacent the nozzle with which it cooperates so that it can apply a deflection, prior to break-up of the stream exiting from the nozzle into droplets, to selected portions of the stream. The droplets, which are formed from the selected portions having the magnetic deflection applied thereto from the magnet cooperating with the nozzle, deflect to a gutter and are not applied to a recording surface, which moves orthogonal to the nozzles. If desired, the winding of the magnet can have a second excitation frequency supplied thereto to break up the stream into droplets. The break-up of the stream into droplets also can be accomplished by vibrations produced by a piezoelectric transducer, for example.

6 Claims, 4 Drawing Figures

FIG. 3
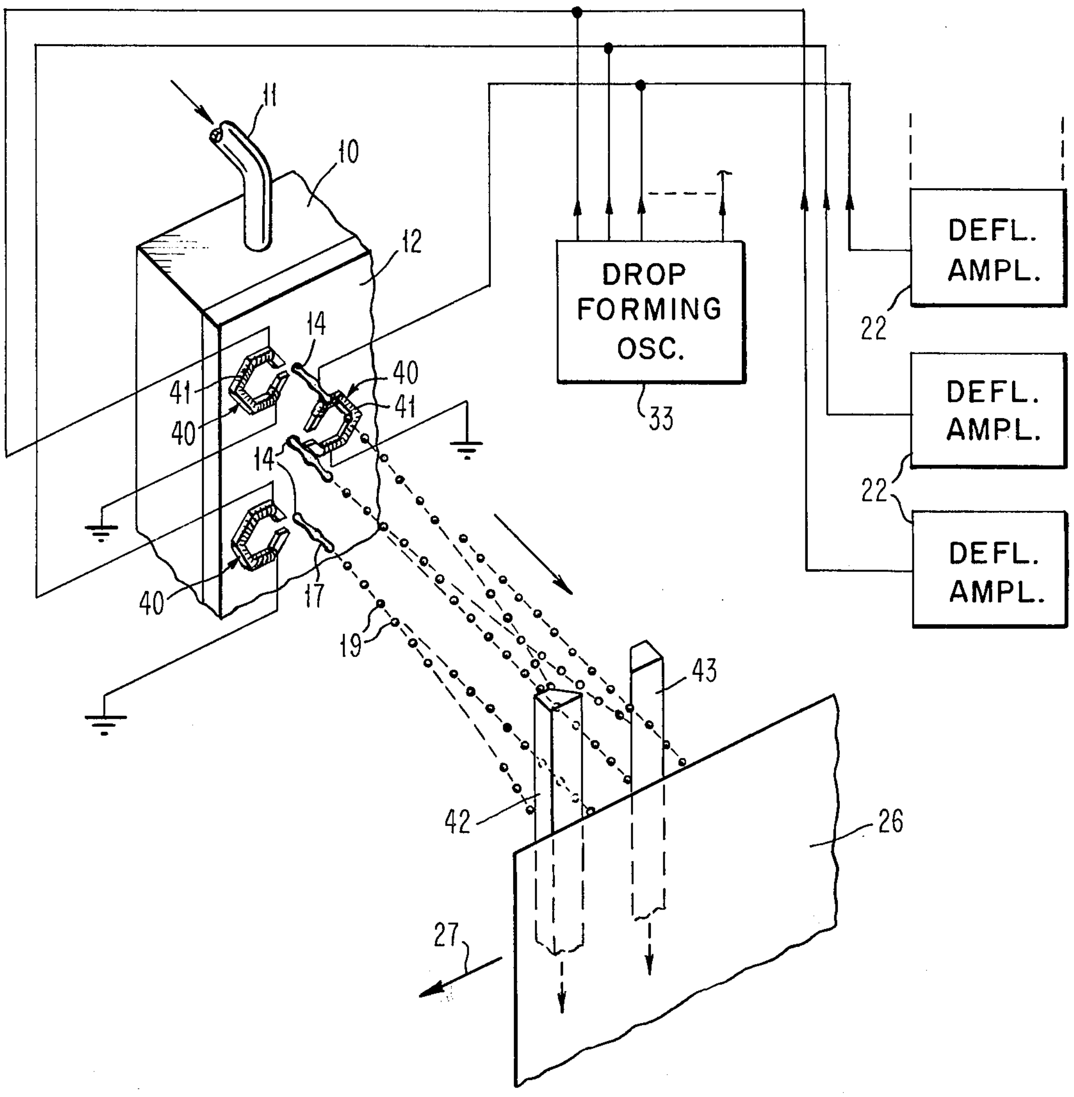
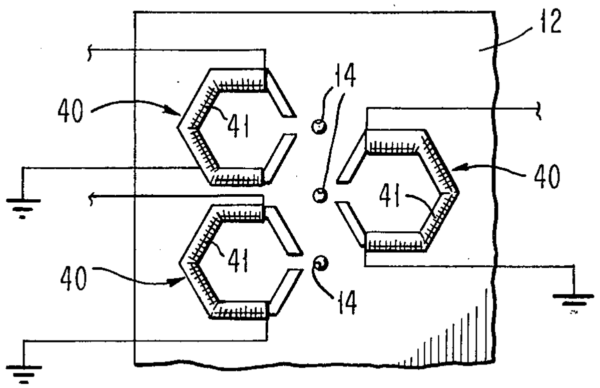
FIG. 4

METHOD AND APPARATUS FOR RECORDING INFORMATION ON A RECORDING SURFACE BY THE USE OF MAGNETIC INK

In nozzle/spot printing, each nozzle directs droplets of an ink stream passing therethrough to a recording surface for application to the recording surface to form a spot thereon in an area on the recording surface aligned with the nozzle. If a spot is not to be printed on the recording surface, then the ink droplets are deflected to a gutter or the like for a predetermined period of time while the recording surface continues to move to present the next area for the particular nozzle.

This type of printing arrangement has been utilized in an electrostatic ink printing system. While it has been suggested to form the charging unit integral with a body having the array of nozzles, it is still necessary to dispose the deflector for the nozzles in spaced relation to the body having the nozzles. As a result, there are interconnection and alignment problems with the deflector spaced from the nozzle and the charging unit integral with the nozzle body.

The present invention satisfactorily overcomes the foregoing problems by utilizing a magnetic ink jet system in which the deflectors for the droplets are formed integral with the body. This provides a compact unit for generating a plurality of streams of droplets for use in a nozzle/spot printing arrangement.

With the present invention, the formation of the magnet integral with the body having the array of nozzles not only avoids the interconnection and alignment problems existing when a magnetic deflector is spaced from the nozzle but it also provides the opportunity for eliminating the requirement for an additional structure to produce vibrations to break-up the stream into droplets.

The present invention accomplishes this through applying two different frequencies to the winding of each of the magnets cooperating with each of the nozzles. Thus, one of the frequencies is an excitation frequency to break up the stream into droplets while the other is a deflection frequency, which provides a substantially DC current so that a substantially constant magnetic field gradient is produced by the magnet.

An object of this invention is to produce a magnetic deflection in a magnetic ink stream prior to break-up of the stream.

Another object of this invention is to provide a magnetic ink jet system having a magnetic deflector for each nozzle of a nozzle array integral with the body having the nozzle array.

A further object of this invention is to provide a magnetic ink jet system in which a stream can be both broken up into droplets and deflected by a single magnet.

Still another object of this invention is to provide a magnetic ink jet system using the nozzle/spot printing arrangement.

The foregoing and other objects, features, and advantages of the invention will be apparent from the following more particular description of preferred embodiments of the invention, as illustrated in the accompanying drawings.

In the drawings:

FIG. 3 is a fragmentary perspective view of a further modification of the magnetic ink jet system of the present invention.

FIG. 4 is an enlarged fragmentary elevational view of a portion of the nozzle array showing the relation of the magnets.

Figure 1:
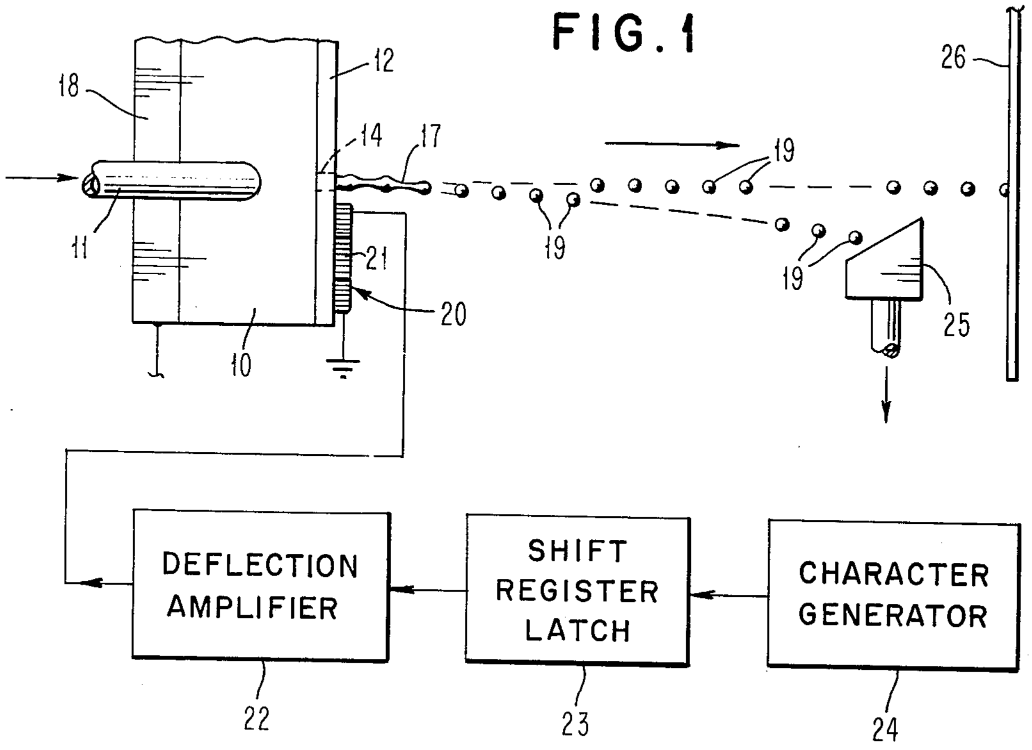
FIG. 1 is a schematic top plan view of one form of the magnetic ink jet system of the present invention.

Referring to the drawings and particularly FIG. 1, there is shown a magnetic ink jet system including a magnetic ink jet manifold 10 to which ink is supplied from a reservoir (not shown) through a supply tube 11. A nozzle plate or body 12 is attached to the manifold 10 and has a plurality of nozzles 14 formed therein communicating with the magnetic ink in the manifold 10. The ink is supplied under pressure to the manifold 10 so that the ink flows from the nozzles 14 in the nozzle plate or body 12 as a plurality of streams 17.

The manifold 10 is subjected to vibrations from suitable vibrating means 18 such as a piezoelectric transducer, for example. The vibrations created by the vibrating means 18 causes each of the streams 17 to be broken up into a plurality of substantially uniformly spaced droplets 19.

The nozzle plate or body 12 is formed of a suitable nonmagnetic material such as silicon, for example. Any other suitable non-magnetic material, which can have a magnetic material adhere thereto, can be employed.

The exit side of the nozzle plate 12 has a magnet 20, which can be a C-shaped or hexagon shaped electromagnet, for example, disposed on one side of each of the nozzles 14. Each of the magnets 20 has its air gap aligned with the nozzle 14 with which it cooperates to produce a desired magnetic field gradient on selected portions of the stream 17 as the stream 17 exits from the nozzle 14 with which the magnet 20 cooperates.

The magnet 20 has a winding 21 thereon to receive a current when a selected portion of the stream 17 with which the magnet 20 cooperates is to be magnetized. The current is supplied to the winding 21 from a deflection amplifier 22, which is connected to a shift register latch 23. The shift register latch 23 is connected to a character generator 24, which can be a computer, for example, to cause the shift register latch 23 to supply the current pulse to the deflection amplifier 22 for the period of time necessary to cause deflection of the selected portion of the stream 17. That is, the length of the selected portion of the stream 17 is determined in accordance with the character being formed.

It should be understood that each of the magnets 20 has one of the deflection amplifiers 22 connected to its winding 21. Thus, all of the deflection amplifiers 22 are connected to the single shift register latch 23, which is connected to the single character generator 24 and controls the current pulses to the deflection amplifiers 22.

Accordingly, magnetization of a selected portion of the stream 17 with which the magnet 20 cooperates results in the droplets 19 formed from the selected portion of the stream 17 being deflected to a gutter 25. For a specific length of the selected portion of the stream 17, the number of the droplets 19 produced therefrom and deflected to the gutter 25 when the magnet 20 produces a magnetic field gradient can vary slightly without affecting the desired results. That is, there can be one more of the droplets 19 or one less of the droplets 19 formed from the selected portion of the stream 17. Since the droplets 19 are employed in nozzle/spot printing, this would only change the contrast of the ink spot on a recording surface such as a paper 26, for example.

The paper 26 moves orthogonal to the nozzle 14 in the direction of an arrow 27. This is toward the viewer in FIG. 1.

With the magnets 20 connected to the nozzle plate or body 12, the magnetic deflection is applied to each of the streams 17 before each of the streams 17 breaks up into the droplets 19. The magnet 20 can be disposed on the nozzle plate 12 by any suitable means and formed of any suitable magnetic material such as a high permeable material, for example. One suitable example is permalloy. Of course, it would be necessary to form portions of the winding 21 on the nozzle plate 12 prior to the film forming the magnet 20 being deposited thereon.

As an example of how the magnet 20 can cause selected portions of the stream 17 to be deflected with the droplets 19 formed from the selected portion of the stream 17 entering the gutter 25, the nozzle diameter will be assumed to be 0.7 mil. If the magnet 20 has an air gap larger than the nozzle diameter such as 1 mil, for example, a magnetic field gradient of $3 \times 10^6$ gauss/cm. can be generated by the magnet 20 when a current is supplied thereto through the winding 21.

The angle of deflection, A, produced by the magnet 20 is determined from the formula of $$A = \frac{\text{film thickness} \times \text{magnetic moment} \times \text{magnetic field gradient}}{(\text{velocity})^2}.$$

If the ink has a magnetic moment of 25 emu/gm., the stream 17 has a velocity of 20 meters/second, and the magnet 20 has a film thickness of 100 microns, then $$A = \frac{(100 \times 10^{-4})\,(25)\,(3 \times 10^6)}{(2000)^2} \simeq 180 \times 10^{-3} \text{ radians.}$$

Accordingly, with a distance of one-half inch between the exit of each of the nozzles 14 and the paper 26, the selected portion of the stream can be deflected 90 mils by the magnet 20. Thus, this is a sufficient deflection for the gutter 25 to intercept the deflected droplets 19 formed from the selected portions of the stream 17 to which the magnet 20 applies a magnetic deflection.

The momentum, which is produced perpendicular to the stream 17 by the magnetic deflection from the magnet 20, may have a portion thereof transferred to the contiguous portions of the stream 17 on each side of the selected portion. This transfer could occur due to loss produces by shear in a viscous fluid and the propagation of the disturbance due to tension in the stream. The loss due to shear is equal to the product of the viscosity and the distance. With the distance being very small, the shear loss, which is due to the propagation of the wave length produced by the momentum applied to the stream 17 by the magnetic deflection from the magnet 20, can be ignored.

As to the propagation of the disturbance due to tension in the stream 17, the velocity of the propagation can be estimated by considering the propagation as an elastic string. In such a case, the velocity of the propagation, V, to the first approximation can be estimated by $$V = (T/p)^{1/2}$$

where $T$ is the tension and $p$ is the mass density. With $T$ approximately equal to II D$a$/2 where $a$ is the surface tension of the ink and equal to 30 dynes/cm. and $p$ approximately equal to II $D^2/4$, then V equals 220 cm/second.

If the breakoff point of the stream 17 at which the stream 17 breaks up into the droplets 19 after leaving the nozzle 14 is 1 mm., then the breakoff time is $50 \times 10^{-6}$ seconds when the stream velocity is 20 meters/-second. Thus, at breakoff time, the propagation of the disturbance is only 110 microns in each direction from the selected portion. If the length of the selected portions of the stream 17 to form a dot or spot on the paper 26 is 300 microns, then the disturbance spreads by less than a factor of two since its total length is 520 microns (That is, 110 microns on each side of the selected portion of a length of 300 microns.).

With the disturbance spreading by less than the factor of two, the total deflection of the stream 17 is approximately 45 mils since the momentum is spread by less than the factor of two. It should be understood that this is based on the deflection of 90 mils between the exit of the nozzle 14 and the paper 26 for the angle of deflection, A, being $180 \times 10^{-3}$ radians and the distance between the nozzle 14 and the paper 26 being ½ inch.

With the deflection of the stream 17 being 45 mils between the exit of the nozzle 14 and the paper 26, the deflection at the gutter 25 is less than 45 mils. Thus, if the gutter 25 is disposed half way between the exit of the nozzle 14 and the paper 26, for example, then the droplet 19 will be deflected 22.5 mils at the time of arrival of the droplets 19 at the gutter 25. This would be sufficient for the deflected droplets 19 to be intercepted by the gutter 25 while the non-deflected droplets 19 would advance to the paper 26.

Figure 2:
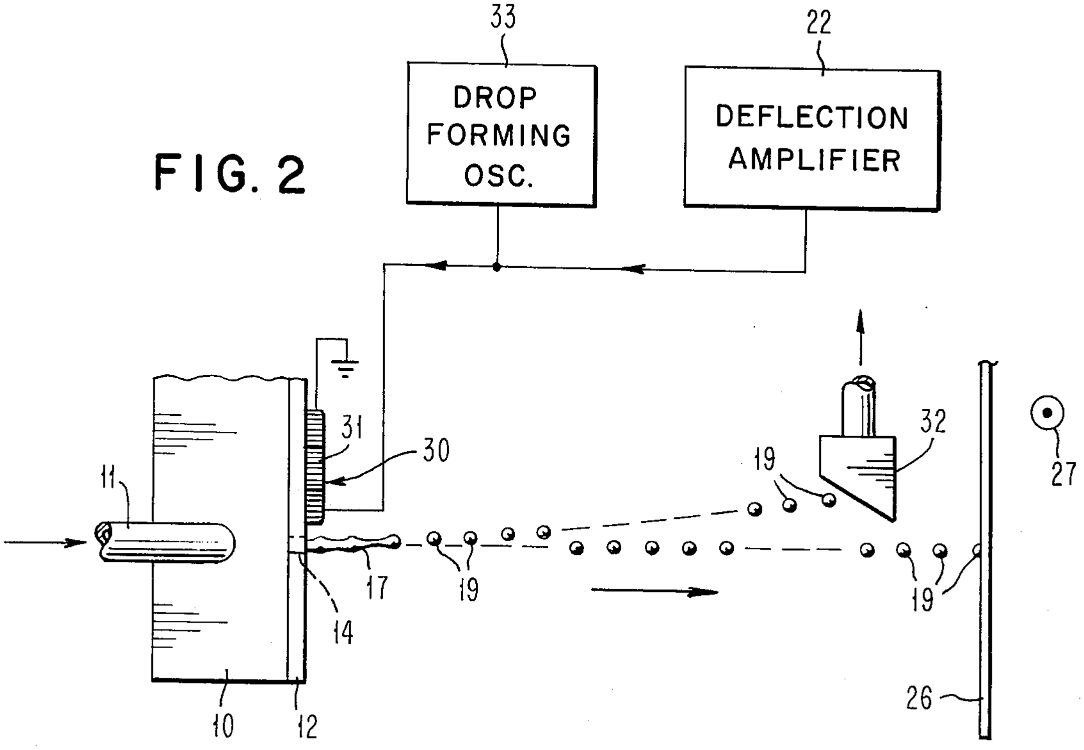
FIG. 2 is a schematic top plan view of another embodiment of the ink jet system of the present invention.

Referring to FIG. 2, there is shown a magnet 30 disposed on the opposite side of the nozzle 14 in the nozzle plate 12 than the magnet 20 in FIG. 1. Thus, each of the magnets 30 deflects the droplets 19 to the left rather than to the right as in FIG. 1 when a current is supplied to its winding 31 so that a gutter 32 is disposed to the left of the streams 17 rather than to the right of the streams 17 as is the gutter 25 in FIG. 1.

Additionally, in FIG. 2, the vibrating means 18 has been eliminated. In place of the vibrating means 18, a second frequency is supplied over the winding 31 of the magnet 30 from a drop forming oscillator 33. The second frequency is an excitation frequency to cause vibrations of the stream 17 so that the stream 17 breaks up into the droplets 19. The second frequency produces perturbations in the stream 17.

It should be understood that each of the magnets 30 has the winding 31 connected to the drop forming oscillator 33. It also should be understood that each of the magnets 30 has one of the deflection amplifiers 22 connected to the winding 31 to receive the deflection frequency and that the deflection amplifiers 22 are connected to the shift register latch 23 and the character generator 24 as in FIG. 1.

Referring to FIG. 3, there is shown another form of the invention in which magnets 40 are formed on the exit side of the nozzle plate 12 with the magnets 40 being formed in two rows. One row of the magnets 40 is disposed on one side of the nozzles 14 and the other row of the magnets 40 is positioned on the opposite side of the nozzles 14. This enables the nozzles 14 of the nozzle plate or body 12 to be disposed closer to each other.

Each of the magnets 40 has a winding 41 connected thereto in the same manner as the magnet 20 has the winding 21. The magnetic deflection is produced by a current in the same manner as in FIGS. 1 and 2.

It is necessary to utilize a gutter 42 for the droplets 19 of the streams 17 deflected in one direction by one of the rows of the magnets 40 and a gutter 43 to receive the deflected droplets 19 of the streams 17 deflected in the opposite direction by the magnets 40 in the other row.

The winding 41 of each of the magnets 40 is connected to the drop forming oscillator 33 so as to have vibrations produced in the streams 17 to break-up each of the streams 17 into the droplets 19. If desired, the drop forming oscillator 33 could be omitted and the vibrating means 18 utilized to cause breakup of the streams 17 into the droplets 19 in the same manner as in FIG. 1.

The vibrating means 18 of FIG. 1 could be eliminated and the excitation frequency applied to the winding 21 of each of the magnets 20 by the drop forming oscillator 33. Furthermore, the arrangement of the magnets 30 in FIG. 2 could employ the vibrating means 18 rather than applying the excitation frequency to the winding 31 of each of the magnets 30 to break-up each of the streams 17 into the droplets 19.

It should be understood that the air gap of each of the magnets 20, 30, and 40 can be less than or greater than the diameter of the nozzle 14 with which the magnet cooperates. However, the air gap is preferably greater than the diameter of the nozzle 14.

While the present invention has shown the deflected droplets being directed to the gutter and the non-deflected droplets being directed to the recording surface, it should be understood that such is not a requisite for satisfactory operation for the embodiments of FIGS. 1 and 2. Thus, in each of these modifications, the deflected droplets could strike the recording surface and the gutter could be disposed to catch the non-deflected droplets if desired.

While the nozzles 14 have been shown as disposed in a vertical row, it should be understood that such is not a requisite for satisfactory operation. Thus, the nozzles 14 could be disposed in a horizontal row, for example. In this arrangement, the paper 26 would have to move vertically.

An advantage of this invention is that all alignment and packaging are accomplished with a single structure and only the gutter is needed beyond the single structure to print on a recording surface. Another advantage of this invention is that it eliminates any difficulties of alignment of the deflector for each of the droplets of the magnetic ink jet stream.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for recording information on a recording surface including:

a nozzle body formed of silicon;

said body having a plurality of nozzles therein;

means to direct a stream of magnetic ink through each of said nozzles and toward the recording surface;

means to cause break-up of each of the streams into droplets after the stream exits from said nozzle and prior to application to the recording surface;

separate means to selectively apply a magnetic deflection to selected portions of each of the streams prior to break-up to cause deflection of the droplets formed from the selected portions so that the droplets formed from the selected portions or the droplets formed from the non-selected portions strike the recording surface to provide the recorded information on the recording surface;

each of said separate means including a magnet supported on said body adjacent the exit of said nozzle;

means to selectively cause each of said magnets to selectively produce a magnetic field gradient;

each of said magnets having its air gap disposed relative to the exit of said nozzle with which said magnet cooperates to enable application of the magnetic field gradient to selected portions of the stream exiting from said cooperating nozzle;

and each of said magnets includes: a film of magnetic material on said body; and a conductive winding disposed around said film.

2. The apparatus according to claim 1 in which:

said break-up causing means includes means to apply a first frequency to said winding of each of said magnets to create perturbations in the stream to break up the stream into the droplets;

and said selectively causing means includes means to selectively apply a second frequency to said winding of each of said magnets to cause the magnetic deflection to be applied to selected portions of the stream with which said magnet cooperates.

3. The apparatus according to claim 1 in which said break-up causing means includes means to apply vibrations to each of the streams.

4. An apparatus for recording information on a recording surface including:

a plurality of nozzles;

means to direct a stream of magnetic ink through each of said nozzles and toward the recording surface;

means to cause break-up of the streams into substantially uniformly spaced droplets after the stream exits from said nozzle and prior to application to the recording surface;

separate electromagnetic means to selectively act on selected portions of each of the streams after each of the streams exits from said nozzle and prior to break-up to selectively apply a magnetic field gradient to the selected portions to each of the streams after each of the streams exits from said nozzle and prior to break-up to produce a magnetic force on the selected portions to cause magnetic deflection of the droplets formed from the selected portions so that only the droplets formed from the selected portions or only the droplets formed from the non-selected portions strike the recording surface to provide the recorded information on the recording surface;

a nozzle body of a non-magnetic material, said body having said nozzles therein;

each of said separate electromagnetic means including a magnet supported on said body adjacent the exit of said nozzle;

means to selectively cause each of said magnets to selectively produce the magnetic field gradient;

each of said magnets having its air gap disposed relative to the exit of said nozzle with which said magnet cooperates to enable application of the magnetic field gradient to selected portions of the stream exiting from said cooperating nozzle;

and each of said magnets having its air gap disposed relative to the exit of said nozzle with which said magnet cooperates so that the stream exiting from said cooperating nozzle does not pass through said magnet or its air gap.

5. An apparatus for recording information on a recording surface including:

a plurality of nozzles;

means to direct a stream of magnetic ink through each of said nozzles and toward the recording surface;

means to cause break-up of each of the streams into substantially uniformly spaced droplets after the stream exits from said nozzle and prior to application to the recording surface;

separate electromagnetic means to selectively act on selected portions of each of the streams after each of the streams exits from said nozzle and prior to break-up to selectively apply a magnetic field gradient to the selected portions of each of the streams after each of the streams exits from said nozzle and prior to break-up to produce a magnetic force on the selected portions to cause magnetic deflection of the droplets formed from the selected portions so that only the droplets formed from the selected portions or only the droplets formed from the non-selected portions strike the recording surface to provide the recorded information on the recording surface;

each of said separate electromagnetic means including a magnet supported adjacent the exit of said nozzle with which said magnet cooperates;

means to selectively cause each of said magnets to selectively produce the magnetic field gradient;

each of said magnets having its air gap disposed relative to the exit of said nozzle with which said magnet cooperates to enable application of the magnetic field gradient to selected portions of the stream exiting from said cooperating nozzle;

and each of said magnets having its air gap disposed relative to the exit of said nozzle with which said magnet cooperates so that the stream exiting from said cooperating nozzle does not pass through said magnet or its air gap.

6. An apparatus for recording information on a recording surface including:

a nozzle;

means to direct a stream of magnetic ink through said nozzle and toward the recording surface;

means to cause break-up of the stream into substantially uniformly spaced droplets after the stream exits from said nozzle and prior to application to the recording surface;

electromagnetic means to selectively act on selected portions of the stream after the stream exits from said nozzle and prior to break-up to selectively apply a magnetic field gradient to the selected portions of the stream after the stream exits from said nozzle and prior to break-up to produce a magnetic force on the selected portions to cause magnetic deflection of the droplets formed from the selected portions so that only the droplets formed from the selected portions or only the droplets formed from the non-selected portions strike the recording surface to provide the recorded information on the recording surface;

said electromagnetic means including a magnet supported adjacent the exit of said nozzle;

means to selectively cause said magnet to selectively produce the magnetic field gradient;

said magnet having its air gap disposed relative to the exit of said nozzle to enable application of the magnetic field gradient to selected portions of the stream exiting from said nozzle;

and said magnet having its air gap disposed relative to the exit of said nozzle so that the stream exiting from said nozzle does not pass through said magnet or its air gap.

* * * * *